United States Patent [19]
Werner et al.

[11] 3,853,546
[45] Dec. 10, 1974

[54] FORCE GAGE

[75] Inventors: Frank D. Werner; Roger D. Bloomfield, both of Jackson, Wyo.

[73] Assignee: said Werner, by said Bloomfield

[22] Filed: Aug. 9, 1972

[21] Appl. No.: 279,189

[52] U.S. Cl............ 73/141 R, 116/114 R, 177/202
[51] Int. Cl. .............................................. G01l 1/06
[58] Field of Search......... 116/114 R, 114 AH, 114; 188/268, 1 C; 297/386; 177/202; 73/141 R, 143, 492, 141

[56] References Cited
UNITED STATES PATENTS

| | | | |
|---|---|---|---|
| 1,696,148 | 12/1928 | Camp | 73/141 A |
| 2,212,547 | 8/1940 | Moseman | 73/35 |
| 2,966,878 | 1/1961 | Feiser, Jr. | 116/114 R |
| 3,077,178 | 2/1963 | Gordon | 116/114 R |
| 3,151,693 | 10/1964 | Chapman | 73/141 A X |
| 3,444,962 | 5/1969 | Lech | 297/386 X |
| 3,482,872 | 12/1969 | Chamberlain | 188/1 C X |

FOREIGN PATENTS OR APPLICATIONS 835,204  3/1952  Germany....................... 73/141 R

*Primary Examiner*—Charles A. Ruehl
*Attorney, Agent, or Firm*—Dugger, Johnson & Westman

[57] ABSTRACT

A bent wire force gage for determining loads or forces exerted by an object which is supported by the gage. The gage yields when it is subjected to load within its design range and then by using a calibration member for determining the final length between the supporting ends of the gage, the load which was lifted can be determined.

6 Claims, 7 Drawing Figures

CALIBRATION

FORCE GAGE

BACKGROUND OF THE INVENTION

1. Field of the Invention

The present invention relates to force gages used primarily for determining the weight of an object, and which are made to yield for the indication of the weight supported.

2. Prior Art

Various force gages have been advanced, some of which have used the principle of having a member which will yield to indicate that a certain force has been exceeded. For example U.S. Pat. No. 2,966,878 shows a ring type force gage in a sling chain which yields and permanently deforms when a particular load has been exceeded. This is a gage that only indicates when a particular load has been exceeded, and is not calibrated to give indications of a particular load that was being carried.

U.S. Pat. No. 3,077,178 issued Feb. 12, 1963 shows an indicator link in a chain which will yield to indicate when the chain has been loaded beyond a preselected load.

A band used on cathode ray tubes is shown in U.S. Pat. No. 3,412,600, issued Nov. 26, 1968 and includes a slot therein, and when the band yields the slot elongates to indicate when the tension in the band has exceeded a preselected amount. However, this is a limited use device which cannot provide adequate measurements across a range of weight.

SUMMARY OF THE INVENTION

The present invention relates to force gages or weighing devices which depend upon the yield characteristics of the material from which the force gage is made to provide an easily used, low cost weighing device. The device will permanently record the force or weight exerted on the weighing device. The deformed device can be accurately calibrated to provide the necessary information.

In the forms of the invention shown, the device comprises members which are formed from metallic material and which include at least two legs that initially are substantially parallel and are joined together at a point remote from the line of force application. As the force is applied, the legs will tend to separate from their substantially parallel condition under load and within the usable range of the gages the metallic material will yield with well known deformation characteristics. After the item has been weighed, or the force has been removed, the deformed unit can be compared to a calibration device to determine what force was exerted. The amount of deformation of the legs of the force gage along the line of application of the load is indication of the force or weight carried by the gage.

Two specific embodiments are shown, one of which is a plate type member that has parallel legs and is formed from a single plate of material into a "U" shape. The legs then are subjected to loads at their outer, unattached ends, and the amount of separation of the legs at the point of attachment of the weight is measured as a function of the weight or force supported. The other form of the invention comprises a wire drawn to uniform diameter that has substantially consistent physical characteristics and is formed, as specifically shown, a more or less "W" shape. The force is applied to the outer ends of the legs, and the amount of separation of the legs indicates the amount of force applied.

The device is usable for a game weighing device, for example, because the device is small, easily carried, light in weight, and can be used directly in the field. The weight range of the device can be adequate to cover the range of weights of most game animals with a sufficient accuracy so that an easily portable scale is provided. The wire form of the invention is preferred for the game weighing device because of its ease of initial forming, uniform physical characteristics, light weight and wide range of operation.

DESCRIPTION OF THE PREFERRED EMBODIMENTS

Figure 1:
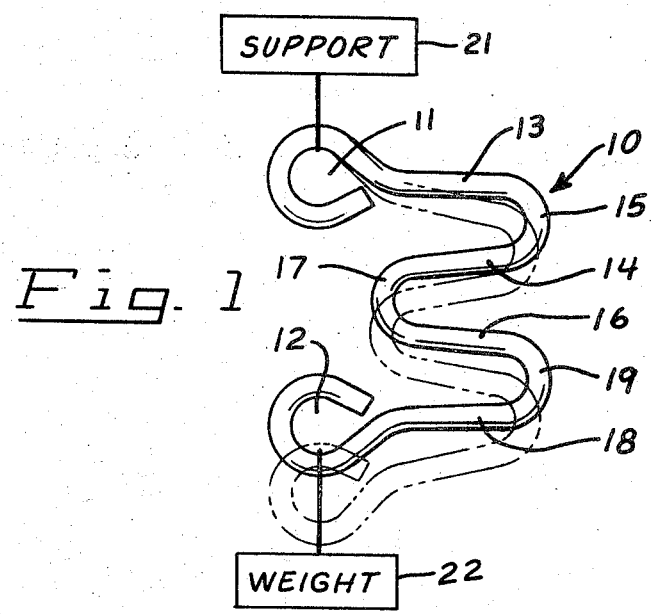
FIG. 1 is a top plan view of a typical force gage made out of round wire shown prior to being used.

FIG. 1 illustrates a force gage made out of round wire, which can be of any desired finished quality. The cross section of the unit is circular. Wire is formed to very close dimensions, and is low in cost. The length of wire is of the suitable physical characteristics relating to its yield stress, and is formed into a force gage indicated generally at 10. The force gage 10 has a support eyelet 11 at a first end thereof, and a load eyelet 12 at a second end thereof. In between the eyelets the force gage has a first length of wire forming a first leg 13 that is formed substantially parallel to a second length of wire forming a second leg 14 joined thereto by a curved or arcuate portion 15. A third length of wire forming a third leg 16 is joined to the leg 14 with a curved or arcuate portion 17, and a length of wire forming a fourth leg 18 is joined to to leg 17 with a curved or arcuate portion 19. The length 18 terminates in the eyelet 12. It can be seen that additional lengths of wire forming substantially parallel legs and joined to the other legs by curved or bend portions could be added if desired so that the overall length of the wire used could be greater. As shown, the force gage is shaped like a "W" laying on its side. If desired, only legs 13 and 14 could be used with the eyelet 12 formed at the end of leg 14 to form a simple two legged "U" shaped device. The legs of the gage, as shown, lie in a common plane.

The force gage 10 is mounted on a support 21, such as a tree or tripod or anything else that could support it, (it can be hand held) and the game animal or object indicated at 22 is supported by eyelet 12. The weight of course, can be any object that is to be weighed such as a game animal. The force gage will have a certain minimum range below which the unit will not yield, and as soon as yield occurs the force gage is in an operable range. The dotted line showing in FIG. 1 illustrates a partially yielded condition of the gage.

Figure 2:
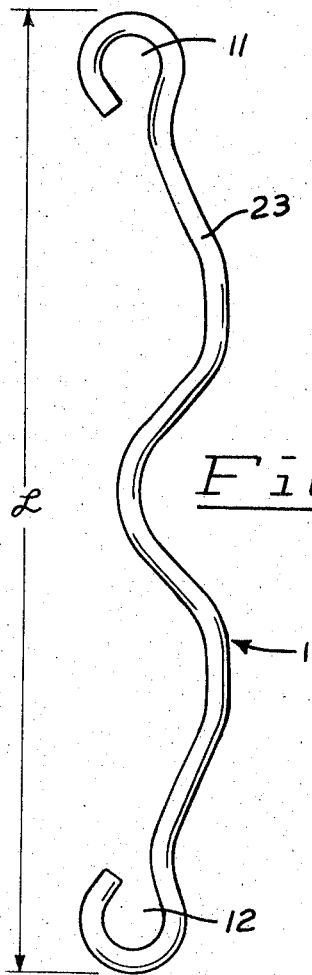
FIG. 2 is a view of the device of FIG. 1 after it has been completely yielded to the full maximum range of force for which it is designed.
Figure 3A:
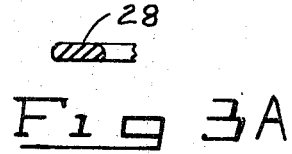
FIG. 3A is a cross section of a flattened wire used for the device of FIG. 1.
Figure 3:
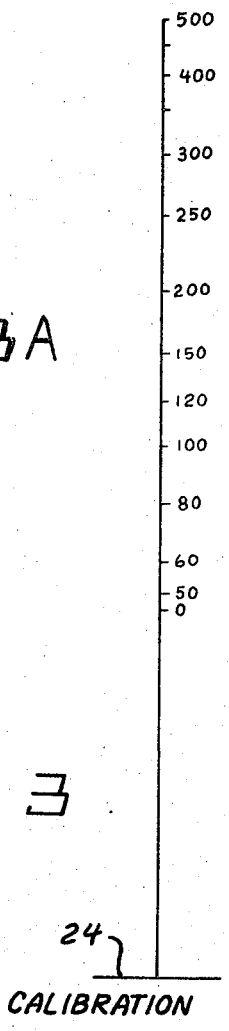
FIG. 3 is a typical calibration line for the device that is shown in FIG. 1 and 2.

As shown in FIG. 2, the force gage has been subjected to a maximum load, and the wire length 23 is substantially straight. The eyelets 11 and 12 are shown, and the distance between the ends of the eyelets indicated at L is the distance that is used in determining what force or load has been applied to the gage. A typical calibration line is shown in FIG. 3. One of the eyelets, for example eyelet 12, would be placed along a reference line 24 of the calibration line shown in FIG. 3, and the upper eyelet 11 would be then positioned along the upright line and the point at which the eyelet crossed the upright line would show what weight had been supported by the gage. The full deflection shown on FIG. 2 would be approximately 500 pounds for the form of the gage shown. The gage as shown, has a range of 50 to 500 pounds. The deflection or yield curve is relatively uniform throughout its length to give accurate results within the tolerances necessary for in the field gam weighing, for example which would be in the range of 5 pounds or less error. The gage in the "W" form has legs 13 and 18 slightly longer so that the center bend 17 opens last and the outer legs 13 and 18 yield at their bends 15 and 19 first, as shown in dotted lines.

The wire can be flattened in the plane of the "W" after forming the gage to increase the bending section moment if desired. The flattening process can be done with a press if desired. Likewise the wire could also be flattened before the gage was formed. A typical flattened cross section is shown at 28 in FIG. 3A. It is therefore also evident that wire having a cross section that is other than round can be used.

Figure 4:
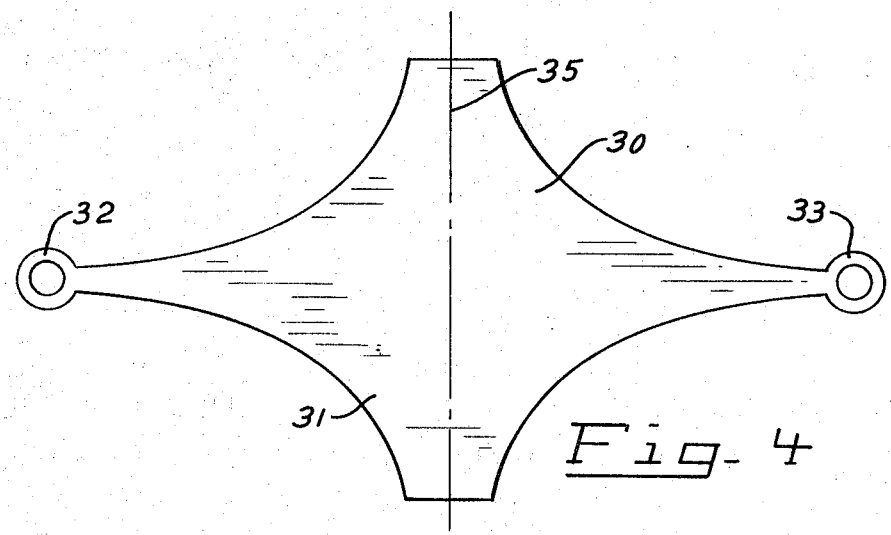
FIG. 4 is a flat layout of a metal plate used for forming a force gage made according to a second form of the present invention.
Figure 5:
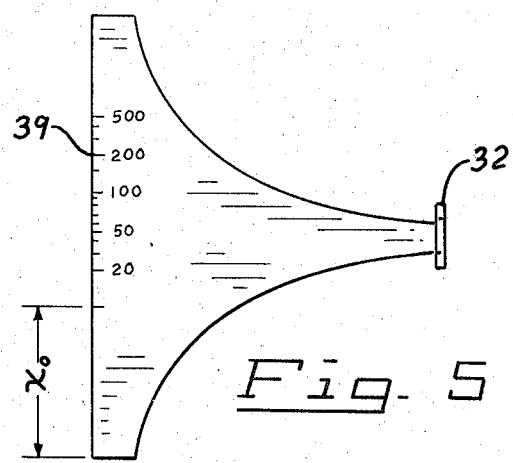
FIG. 5 is a top plan view of the device of FIG. 4 showing it after it is formed.
Figure 6:
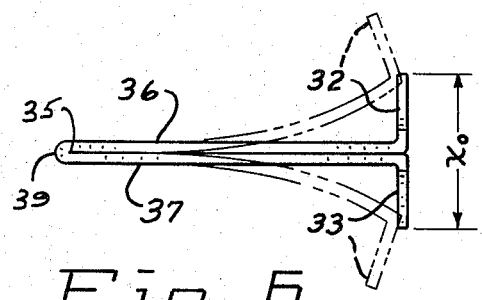
FIG. 6 is a side elevational view of the device of FIG. 1.

In FIGS. 4, 5 and 6, a modified form of the invention is illustrated. The force gage illustrated generally at 30 comprises a flat member 31 cut in flat layout as shown in FIG. 4, with eyelets 32 and 33 formed at opposite ends thereof. The gage is made so that it is symmetrical about a bend line 35, and is then folded over and formed to the configuration shown in FIG. 5. The eyelet 32 is at the top and attached to an upper leg, and the eyelet 33 extends downwardly and is attached to the bottom leg as shown in FIG. 6. The plate then forms two legs 36 and 37 which are joined by the bend portion 38.

The force is applied by supporting the gage at one of the eyelets, for example eyelet 32 and the weight or other device exerting the force at the opposite eyelet, for example eyelet 33 and then subjecting the gage to load. The calibration curve indicated generally at 39 can be painted or applied with a decal or label directly to the edge of the gage if desired. The measurement of the amount of separation of the eyelets for example as shown in dotted lines after being subjected to loads is then transferred back to the calibration curve 39. The $X_o$ distance shown in FIG. 5 is the original length between the outer edges of the eyelets.

Both forms of the invention show force gages which comprise legs that are joined by a bend portion of yieldable material at one end and overlie each other in the direction for force application. The legs tend to straighten out when the legs are subjected to loads at opposite ends from the bend portion. The use of the round wire has the advantage of giving a highly uniform thickness, and of course the plate member 30 also can be uniform in thickness, particularly if it is cold rolled metal or the like.

The force gages are not reusable, because once they have been yielded they will not measure any weight lower than the first weight or force measured, although a force gage that has been used for relatively low load could be used for a higher load if desired. For example, if a force gage was used to weigh a light animal in the field during hunting, and a heavier animal was shot, the heavier animal could also be weighed because the yield characteristics could not be affected at the higher loads by the original load.

The unit is not an elastic deformation spring as is used for spring force gages, but is of a plastic material where the load-yield relation for the material is a repeatable relation that can be used for calibration purposes.

The device is low in cost and effective in operation. It is easily carried and will permanently record forces or loads exerted.

The gage calibration lines shown in FIGS. 3 and 5 both are nonlinear i.e., the amount of deformation or separation of the load supporting ends between 50 and 100 pounds, for example, is about the same as the separation which occurs between 100 and 200 or between 300 and 500 pounds. Stated another way the deformation for a given amount of weight is less at the higher weight or force ranges of the gages than at the lower weight or force ranges. Thus the percentage error in a weight reading can be kept relatively low. A given error in reading the length of the gage after yielding would be about the same percentage at low levels as at high levels, while on a linear scale, a given error would be a higher percentage at low force levels than at high force levels.

What is claimed is:

1. A gage combination for determining the amount of force applied to the gage, comprising a first leg member and a second leg member which are spaced apart, third and fourth leg members connecting said first and second leg members and positioned between said first and second leg members, said third and fourth leg members being joined together adjacent first ends thereof, and opposite ends of said third and fourth leg members being joined to the first and second leg members, respectively, means to apply force to said first and second leg members at locations spaced from the junctions of said first and second leg members to said third and fourth leg members, respectively, to tend to cause separation of said first and second leg members, said force being in a range which causes permanent deformation of at least portions of said leg members whereby the deformation of said portions of said leg members indicates the amount of force applied to said gage, and means providing indicia calibrated to directly indicate the force applied to said gage in relation to the amount of separation of said leg members.

2. The combination specified in claim 1 wherein said leg members are made of wire.

3. The combination specified in claim 1 wherein said leg members have a first normal position and said first and second leg members are longer than said third and fourth leg members to provide permanent deformation of said first and second leg members from their normal position prior to deformation of said third and fourth leg members from their normal position when force is applied to said gage.

4. A portable load gage for determining the amount of load supported by said gage across a useable load range comprising a single piece of wire bent upon itself to form at least one bend portion and at least two legs lying in a common plane extending from said bend portion and overlying each other in the direction of load application, said wire being flattened in direction of the common plane to increase the bending section of the wire in the bend portion, means on outer portions of said legs spaced from said bend portions for applying a load to be measured by said gage, said outer portions of said legs separating and the wire yielding and permanently deforming from loads applied thereto in the useable range of said gage to give an indication of the load applied by the amount of separation of said legs.

5. A portable load gage for determining the amount of load supported by said gage across a useable load range comprising a single piece of wire bent upon itself to form a generally W shaped gage comprising first, second, third and fourth legs joined together by bend portions of said wire, said first and second legs being spaced apart and joined by said third and fourth legs, respectively, said first and second legs extending substantially parallel to each other, and overlying each other in the direction of load application, means on outer portions of said first and second legs spaced from said bend portions for applying a load to be measured by said gage, said outer portions of said first and second legs separating and the wire yielding and permanently deforming from loads applied thereto in the useable range of said gage to give an indication of the load applied by the amount of separation of said first and second legs.

6. The combination as specified in claim 5 wherein said third and fourth legs are shorter than said first and second legs, and said legs all lie in a common plane.

* * * * *